(12) United States Patent
Shilimkar

(10) Patent No.: US 8,973,136 B2
(45) Date of Patent: Mar. 3, 2015

(54) SYSTEM AND METHOD FOR PROTECTING COMPUTER SYSTEMS FROM MALWARE ATTACKS

(75) Inventor: Sunil Namdeo Shilimkar, Pune (IN)

(73) Assignee: Quick Heal Technologies Private Limited, Fune, Maharashtra (IN)

( * ) Notice: Subject to any disclaimer, the term of this patent is extended or adjusted under 35 U.S.C. 154(b) by 0 days.

(21) Appl. No.: 13/385,571

(22) Filed: Feb. 27, 2012

(65) Prior Publication Data

US 2014/0075555 A1 Mar. 13, 2014

(51) Int. Cl.
G06F 11/00 (2006.01)
H04L 29/06 (2006.01)
G06F 21/56 (2013.01)

(52) U.S. Cl.
CPC .............. G06F 21/56 (2013.01); G06F 21/566 (2013.01); G06F 2221/2119 (2013.01)
USPC ............................................ 726/23; 713/164

(58) Field of Classification Search
CPC ......... G06F 9/45537; G06F 9/53; G06F 9/54; G06F 21/56; G06F 21/566; G06F 2221/2119
USPC ......... 713/164, 201, 2, 6, 165, 166, 167, 187; 726/23, 24, 25, 26, 28, 30; 719/317, 719/328; 707/4, 201; 380/242; 718/1, 104
See application file for complete search history.

(56) References Cited

U.S. PATENT DOCUMENTS

| | | | | |
|---|---|---|---|---|
| 7,596,694 B1 * | 9/2009 | Karp et al. | ...................... | 713/164 |
| 8,099,596 B1 * | 1/2012 | Rusakov et al. | .............. | 713/164 |
| 8,112,749 B2 * | 2/2012 | Jelinek et al. | ...................... | 718/1 |
| 8,266,714 B2 * | 9/2012 | Wang et al. | ...................... | 726/29 |
| 8,549,173 B1 * | 10/2013 | Wu et al. | ......................... | 709/238 |
| 2002/0095595 A1 * | 7/2002 | Christopherson et al. | .... | 713/200 |
| 2006/0174078 A1 * | 8/2006 | Robison | ......................... | 711/163 |
| 2008/0177994 A1 * | 7/2008 | Mayer | ............................... | 713/2 |
| 2009/0113425 A1 * | 4/2009 | Ports et al. | ......................... | 718/1 |
| 2010/0064299 A1 * | 3/2010 | Kacin et al. | ..................... | 719/317 |
| 2010/0115332 A1 * | 5/2010 | Zheng et al. | ........................ | 714/6 |
| 2010/0251235 A1 * | 9/2010 | Ganguly et al. | .................... | 718/1 |
| 2011/0055892 A1 * | 3/2011 | Wang et al. | ........................ | 726/3 |
| 2011/0197142 A1 * | 8/2011 | Tsao | ............................. | 715/743 |
| 2013/0036448 A1 * | 2/2013 | Aciicmez et al. | .................. | 726/1 |
| 2013/0159999 A1 * | 6/2013 | Chiueh et al. | ....................... | 718/1 |
| 2013/0160012 A1 * | 6/2013 | Ganguly et al. | .................... | 718/1 |
| 2013/0198747 A1 * | 8/2013 | Larkin et al. | ....................... | 718/1 |
| 2013/0198764 A1 * | 8/2013 | Kacin et al. | ..................... | 719/328 |
| 2014/0007139 A1 * | 1/2014 | Janssen et al. | .................. | 719/321 |
| 2014/0080591 A1 * | 3/2014 | Kaarela et al. | .................. | 463/29 |
| 2014/0150122 A1 * | 5/2014 | Erlingsson | ...................... | 726/30 |

* cited by examiner

Primary Examiner — Abu Sholeman
(74) Attorney, Agent, or Firm — Feldman Law Group, P.C.; Stephen E. Feldman

(57) ABSTRACT

The malware protection system provides a virtual logon session which runs in the background invisible to the user. The virtual logon session is created on a computer system with the help of the operating system using a separate/partitioned kernel resources such as a desktop, that provides a limited access environment under the context of a logged-on user. The system is configured to run applications inside virtual logon sessions under the logged-on user's credentials with limited access. The system also includes an interceptor module that launches the web browser or web application inside the virtual logon session. The interceptor module intercepts every URL passing through the web browser or web application being run in the virtual logon session. The module checks if the primary web URL is infected by malware and adds the malicious URL to a malicious URL database and a non-malicious URL to a non-malicious URL database.

12 Claims, 12 Drawing Sheets

SYSTEM AND METHOD FOR PROTECTING COMPUTER SYSTEMS FROM MALWARE ATTACKS

FIELD OF THE INVENTION

In general, the present invention relates to computer protection and, in particular, to a system and method for protecting computer systems from malware attacks.

BACKGROUND OF THE INVENTION

Browsing the interne has become the integral part of the daily life for most of the people from all over the world. Malicious content such as drive-by download malwares, such as, for example, rouge/fake anti-spyware, rouge/fake anti-Virus, adware, spyware, worm, virus, Trojan, Bot et cetera pose ever increasing threat to computer security. One wrong mouse click on unknown/bad/malicious website or Uniform Resource Locator (URL) link and malicious content could be easily installed on the computer unbeknown to the users. The consequence of which could be serious damage to the computer system or the loss of valuable user data or stealing of confidential information and user identity, and all this translates into huge loss to countries, companies and individuals.

Conventional security solutions require malware identification for each malware which is stored in a huge database. Further, these solutions require periodic updates to add new malware detection capabilities. In short, conventional security solutions do not block unknown malware, and make use of heuristic algorithms. Heuristic algorithms are not 100% accurate and can give false alarms. Heuristic logic interprets Central Processing Unit (CPU) assembly/instruction code or intermediate script level computer language of the program/application to identify the malware. The heuristic logic which is thus used does real time monitoring of behavior and operations of the running programs/applications for various malicious activities which may result into various user prompts causing immense annoyance and distraction to the user.

Further, with passage of time malware signature and definitions database tends to grow gargantuan in size. The user has to update malware definitions on a regular basis. Therefore, the huge increase in database size affects the performance of the anti-malware software.

Furthermore, the analyses of the malware require skilled manpower and is a time consuming process. There is huge time window between analysis of the malware, detection and finding a cure for the malware. The present invention specifically aims to address these disadvantages.

SUMMARY OF THE INVENTION

A system and method for protecting computers from malware attack is described. Accordingly, a method for protecting a computer from a malware attack that includes the steps of providing a user virtual logon session desktop for running a plurality of user-selected processes for launching a plurality of user selected processes in the context of logged-on user virtual logon session, requesting system service elements to launch user selected processes depending upon logged-on user context and intercepting user interface element for monitoring creation of window in context of user virtual logon session, monitoring creation of window and synchronously by checking window attributes identifying a main window of application; and intercepting and tracking window and events for said window. The method for protecting a computer from malware attack also includes intercepting and monitoring open and creation APIs for kernel resources using a user-mode level native API interception element and running an application inside in context of user virtual logon session and requesting a kernel resource for open and create APIs. The method further includes the user-mode level native API interception element resolving full path of said kernel resource by querying kernel resource namespace manager before calling original native API; and calling original native API upon determining the availability of kernel resource to logged-on user and need for direct access depending upon logged-on user privileges; and calling original native API upon determining partitioning of kernel source path.

Accordingly, a computer embeddable system for protecting a computer from malware attack includes a user virtual logon session desktop space and a security authority plug-in that runs inside a privileged space of an operating system with operating system privileges and rights to create and modify user credentials. The system further includes a user virtual session logon session manager that runs inside said privileged space with operating system privileges and rights, and manages multiple virtual logon sessions by getting logon notification for a plurality of users and interacts with said security plug-in to create and modify user credentials and launches partitioned applications. The system also includes a client server application authentication manager component that launches a separate instance of application server for every user logon session as requested by a client application under same logged-on user context and a user credentials API interception component that returns virtual logon session identification number for user credentials used for launching partitioned server applications, and, thereby, changes behavior of a client server application authentication manager component. Further, the user virtual logon session desktop space is enabled to run a plurality of applications run on the computer created by using partitioned kernel resources and a limited access environment and partitioned kernel resource namespace for a logged-on user context. The user virtual logon session desktop space is also configured to run applications under logged-on user credentials with limited access.

STATEMENT OF THE INVENTION

A system and method that provides protection to computers from malware attack by running applications in a partitioned environment is described.

BRIEF DESCRIPTION OF THE DRAWINGS

The above mentioned and other features, aspects and advantages of the present invention will become better understood with regard to following description, appended claims and accompanying drawings, wherein like reference numerals refer to similar parts throughout the several figures where:

Figure 1:
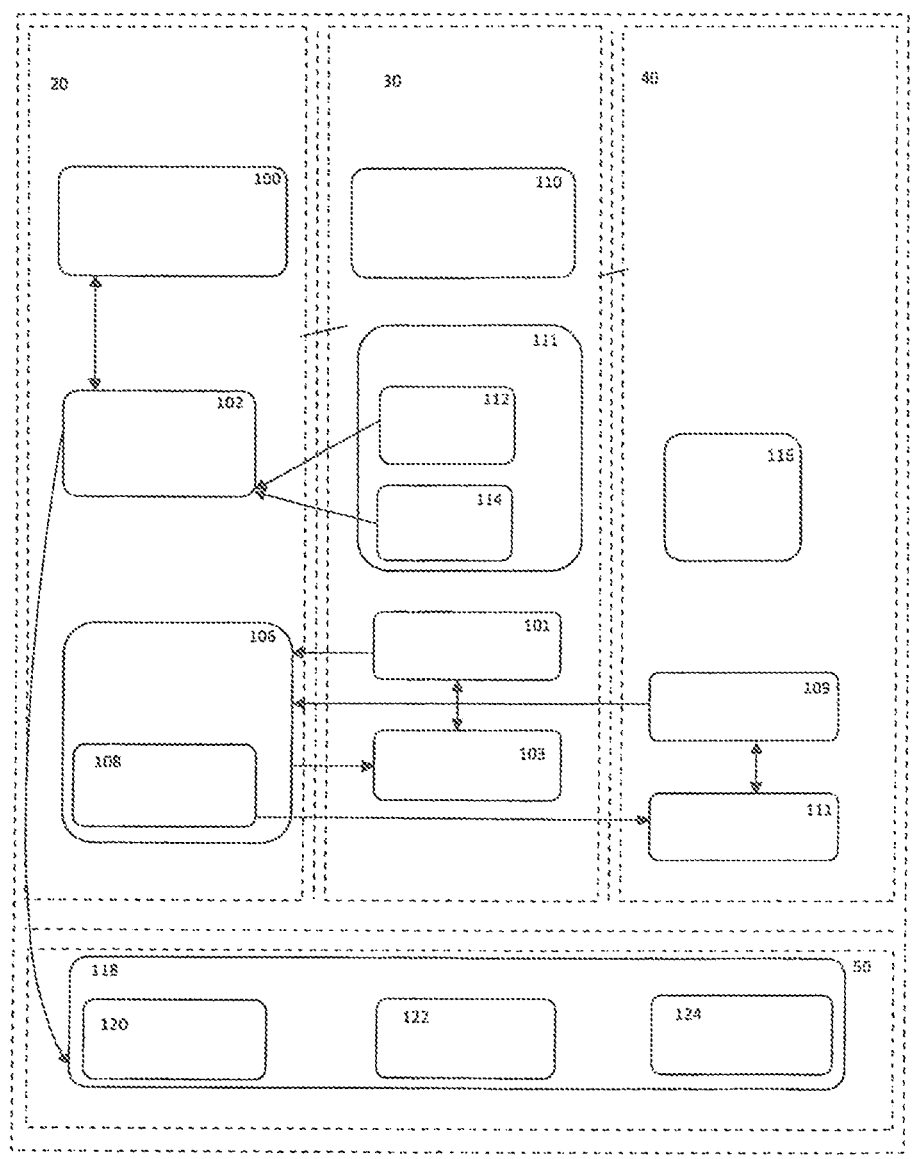
FIG. 1 shows a block diagram for a preferred embodiment of a system in accordance with the present invention.

It should be understood that the drawings are not necessarily to scale. In certain instances, details which are not necessary for an understanding of the present invention or which render other details difficult to understand may have been omitted. It should be understood, of course, that the invention is not limited to the particular embodiments illustrated herein.

DETAILED DESCRIPTION OF THE INVENTION

Although specific terms are used in the following description for sake of clarity, these terms are intended to refer only to particular structure of the invention selected for illustration in the drawings, and are not intended to define or limit the scope of the invention.

Referring to FIG. 1, a block diagram of a system, various components in the system and the interaction of the components of the system including component of an Operating System (OS) in accordance with the present invention is shown.

The system operates in four spaces:
1. Operating system's Privileged Space and System Components 20;
2. Logged-on User's Regular/Original Desktop 30 that represents user's Logon Session;
3. Logged-on User's Separate/Partitioned Desktop 40 that represents user's Virtual Logon Session; and
4. Operating System Kernel Driver Space 50.

The system includes a Security Authority Plug-in (SAP) Component 100 that runs inside Operating System's privileged space with OS privileges and rights. SAP 100 is responsible for copying or modifying user's credentials (also known as user token) and becomes a part of Operating System's (OS) security component which has special privileges and rights to create user credentials (user token). (E.g. LSASS—Local Security Authority System Service on Windows NT/2000/XP/Vista/7.0 etc.).

The system further includes a User Virtual Logon Session Manager (UVLSM) Component 102 that runs inside Operating System's privileged space with OS privileges and rights. UVLSM 102 manages multiple user virtual logon sessions by getting logon notification for multiple users and also interacts with SAP 100 to create/modify user credentials (user token) and launches partitioned application(s). UVLSM 102 also provides interface to a User Interface Client (UIC) component to launch applications inside partitioned desktop environment. SAP 100 provides an interface to UVLSM 102 for creation/modification of logged-on user's credentials (user token).

The system in accordance with the present invention further includes a Client Server Application Authentication Manager (CSAAM) Component 106 which is an Operating System (OS) component which runs inside OS's privileged space. CSAAM 106 component launches a separate instance of application server per user virtual logon session and as per client application's request under same logged-on user's context.

Further, the system includes a User Credentials API Interception (UCAPII) Component 108. UCAPII module 108 resides inside CSAAM 106 OS component and changes behavior of CSAAM 106 component by returning a fake/virtual logon session identification number or alternative integrity level for the user credentials (user tokens) which is used for launching partitioned server application(s).

The user credentials (user tokens) are created and modified by UVLSM 102 with the help of SAP 100 and are derived from original user credentials (user tokens) of a logged-on user. CSAAM 106 launches the separate instance of the application server for partitioned client application(s) 109 and partitioned server application(s) 111 apart from the client application(s) 101, 103 running on regular/original desktop.

The Security Authority Plug-in (SAP) Component 100, the User Virtual Logon Session Manager (UVLSM) Component 102, the Client Server Application Authentication Manager (CSAAM) Component 106 and User Credentials API Interception (UCAPII) Component 108 that resides with CSAAM 106 together form Operating system's Privileged Space and System Components space.

The system further includes a User Interface Client (UIC) Component 110. UIC 110 runs on a regular/original desktop and provides user interface to manipulate user settings. User also specifies list of applications especially web application) such as web browsers, instant messengers, email application(s), document application(s) via UIC 110, for example and runs them by default inside partitioned environment.

The system further includes a User Interface Shell Extension Client (UISEC) Component 112. UISEC 112 becomes a part of the OS shell 111 by using shell extension facility of the OS and provides a user interface to launch any application on demand to run inside partitioned environment. The user interface UISEC 112 is integrated with file/program manager of the OS shell 111. The user right clicks a mouse button on any executable/application to pop up UISEC 112.

The system in accordance with the present invention further includes a Process API Interception Client (PAPIIC) Component 114. PAPIIC 114 is an interception module that intercepts the process creation APIs (applications) for applications running inside regular desktop as well as an OS shell 111. Before process gets created, PAPIIC 114 matches applications name and path with the list of application(s) provided by user using UIC 110. If the name and path of intercepted applications match with the name and path of the list of application(s) provided by user using UIC 110, PAPIIC 114 launches applications inside partitioned environment with the help of UVLSM 102.

The User Interface Client (UIC) Component 110, the User Interface Shell Extension Client (UISEC) Component 112 and the Process API Interception Client (PAPIIC) Component 114 form Logged-on User's Regular/Original Desktop space. Client Applications and Server Applications are run in this space.

The system in accordance with the present invention further includes a Kernel Resource API Interception Client (KRAPIIC) Component 116. KRAPIIC 116 is an interception module which intercepts the kernel resources, such as synchronization, inter process communication, file system, registry kernel resources, for example, and Open/Create native APIs. KRAPIIC 116 makes copies of special kernel resources at partitioned location, such as, file system, registry, for example. KRAPIIC 116 diverts the API call to partitioned location if user or application has write access to the kernel resource. Synchronization and inter process communication kernel resources are directly diverted to partitioned location except for few system specific kernel resources inside kernel resource name space.

The Kernel Resource API Interception Client (KRAPIIC) Component 116 resides in the Logged-on User's Separate/Partitioned Desktop. KRAPIIC 116 resides within all partitioned applications in this space.

The system in accordance with the present invention further includes a Kernel Filter Device Driver (KFDD) Component 118. KFDD 118 is a device driver that resides inside the OS kernel space and monitors the various operations of the applications running inside partitioned environment, such as, file system, registry and process operations, for example.

The system in accordance with the present invention further includes a File System Filter Module (FSFM) 120. FSFM 120 is a part of KFDD 118 and resides inside the OS kernel space. FSFM 120 filters the various file system operations of the applications running inside partitioned environment. UVLSM 102 component specifies file system rules which include file system paths and action that needs to be taken. FSFM 120 follows the file system rules to deny/allow/read-only/read-write access to file system kernel resources in the context of partitioned applications.

The system in accordance with the present invention further includes a Registry Filter Module (RFM) 122. RFM 122 is a part of KFDD 118 which resides inside the OS kernel space. RFM 122 filters the various registry operations of the applications running inside partitioned environment. UVLSM 102 component specifies registry rules which include registry key paths and action that needs to be taken. RFM 122 follows the registry rules to deny/allow/read-only/read-write access to registry kernel resources in the context of partitioned applications.

The system in accordance with the present invention further includes a Process Filter Module (PFM) 124. PFM 124 is a part of KFDD 118 which resides inside the OS kernel space. PFM 124 filters the various process operations of the applications running inside partitioned environment. UVLSM 102 component specifies process rules which includes process paths and action that needs to be taken. PFM 124 follows the process rules to deny/allow/notify for process kernel resource in the context of partitioned applications. The Kernel Filter Device Driver (KFDD) Component 118 forms the OS Kernel (Driver) space.

According to the present invention, the user selects the program(s)/application(s) which are needed to be run inside Virtual Logon Session of the user using given user interface. The user may right-click on the mouse button on the program/application icon to select the application. The user may navigate with the help of file manager or operating system's shell or desktop environment popup menu.

The user's Virtual Logon Session/Partitioned Environment includes a new and separate (hence partitioned) desktop kernel resource element in which partitioned application(s) are run. Modified user credentials or user tokens of the logged-on user are used by the Virtual Logon Session and only a limited (non-administrator) access is given to the system. A copy of modified user token is created for Virtual Logon Session in which unique identifier is inserted using newly created user group or user or un-used member of the user token.

A security authority element, which becomes part of the Operating System, helps in copying and modifying user credentials. A user-mode level native Application Programming Interface (API) interception element also monitors APIs running in partitioned application(s) and opening existing or creating kernel resources, such as, thread synchronization kernel resources, IPC (Inter Process Communication) kernel resources, for example and file system kernel resources, such as, files and folders, for example, and application settings database (application settings namespace) kernel resources also known as registry.

The user-mode level native API interception element also ensures that the kernel resource paths are diverted to separate/partitioned storage/location area also known as kernel resource directory/container. The user-mode level native API interception element also ensures that the special kernel resource paths are diverted to separate/partitioned storage/location area (such as file system or registry directory/container for respective kernel resources) if user credentials (user token) have read/write access to the existing kernel resource and also user credentials are creating new kernel resources.

The user-mode level native API interception element further monitors the operating system services while requesting information such as session id (unique id for user's logon session) or integrity level (one of the user token attribute for user access control) for modified user token derived from current logged-on user token. The user-mode level native API interception element further provides fake session id (which is unique and relative to the existing session id) or alternative integrity level to system services when same information is requested for the modified user token to change the behavior of CSAAM 106. This results into a launch of separate server application which is generally shared among several client applications running under same logged-on user's session (desktop) when client application does specific requests to the operating system component.

It is also noted that the system in accordance with the present invention is embeddable and installable on external storage media, such as, USB pendrives, Micro SD cards, DVDs, for example, and the system is enabled to be auto-run directly from a USB dongle. Therefore, a user can use such a USB dongle embedded and installed with the present system when he's using a computer prevent malware attacks while browsing the internet. It is further noted that the present system not just limited to computers and also include devices such as smartphones where a Mirco SD card embedded and installed with the present system can be used.

UVLSM 102 becomes a part of the operating system and provides the interface through Inter Process Communication (IPC) to the client application which provides user interface and/or a user interface which is part of the operating system's shell or desktop environment. UVLSM 102 also performs privileged operations such as modifying user token, handling multiple users' logon session and launching the application into corresponding user's logon session's partitioned environment (separate desktop). A device driver kernel element becomes a part of the operating system's kernel and monitors kernel resources such as file/folder, registry, process and thread open/creation/termination and modification operations etc. The device driver kernel element also denies access or gives read only access to certain kernel resource paths as per specified by UVLSM 102 for partitioned application(s). A visual color border is provided around the main application window in addition to the main window border or separate border around the desktop window to indicate that application(s) running inside the partitioned environment.

Figure 2:
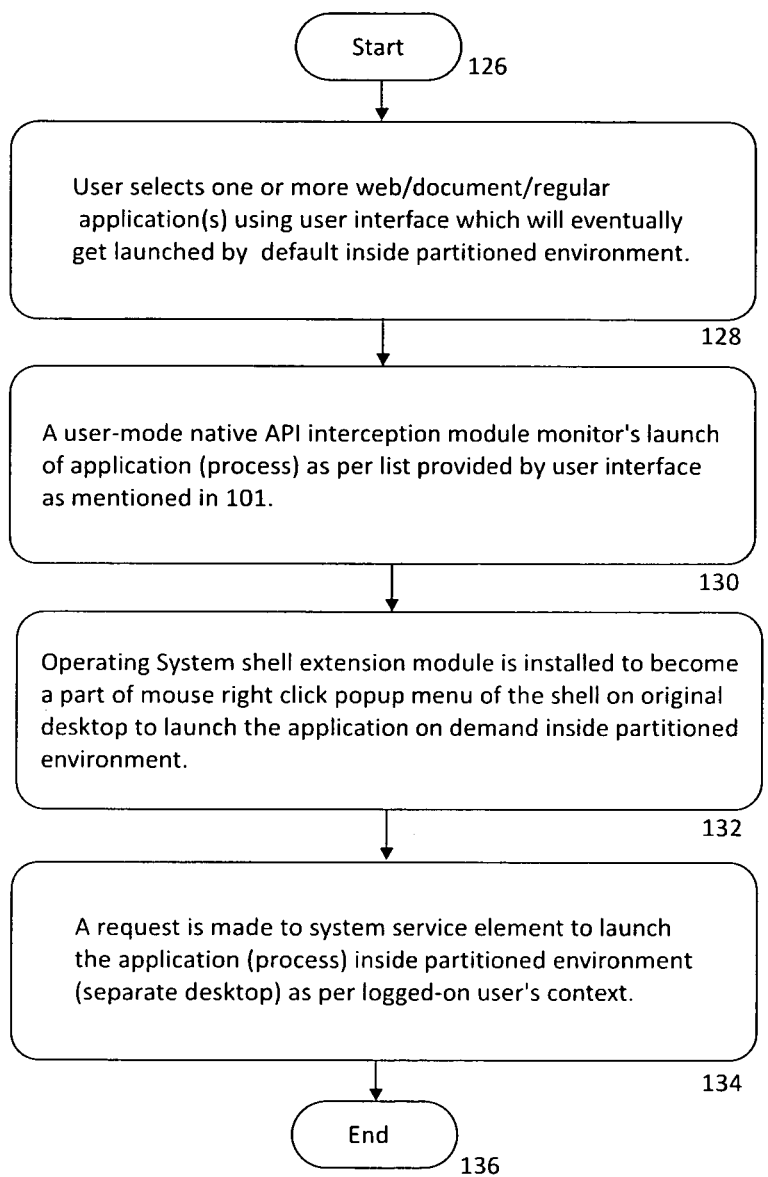
FIG. 2 shows a flowchart for user interface element which facilitates the user to launch a plurality of applications inside partitioned environment in accordance with the present invention.

Referring to FIG. 2, a flow diagram for user interface element which facilitates the user to launch a plurality of applications inside partitioned environment in accordance with the present invention is shown. The process starts at 126 and at step 128 a user selects one or more web/document/regular application(s) using user interface which will eventually get launched by default inside partitioned environment. The process moves to 130. A user-mode level native API interception module monitor's launch of application (process) as per list provided by user interface at step 128 and the process moves to 132. At 132, Operating System shell extension module is installed to become a part of mouse right click popup menu of the shell on original desktop to launch the application on demand inside partitioned environment and the process moves to step 134. At step 134, a request is made to system service element to launch the application (process) inside partitioned environment (separate desktop) as per logged-on user's context. The process terminates at step 136.

Figure 3:
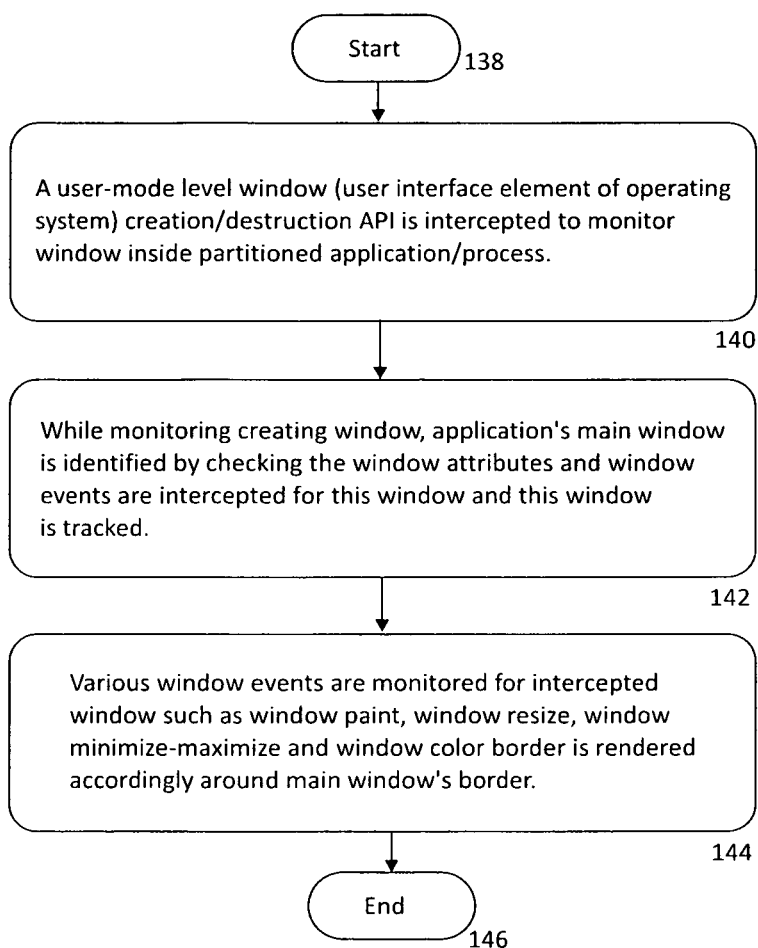
FIG. 3 shows a flowchart for user interface element which facilitates the user to launch a plurality of applications inside partitioned environment in accordance with the present invention.

Referring to FIG. 3, a flow diagram for user interface element which facilitates the user to launch a plurality of applications inside partitioned environment in accordance with the present invention is shown. The process starts at 138 and at step 140 a user-mode level window (user interface element of operating system) creation/destruction API is intercepted to monitor window inside partitioned application/process. The process moves to 142 wherein while monitoring creating window, application's main window is identified by checking the window attributes and window events are intercepted for this window and this window is tracked and the process moves to 144. At 144, various window events are monitored for intercepted window such as window paint, window resize, window minimize-maximize and window color border is rendered accordingly around main window's border. The process terminates at step 146.

Figure 4:
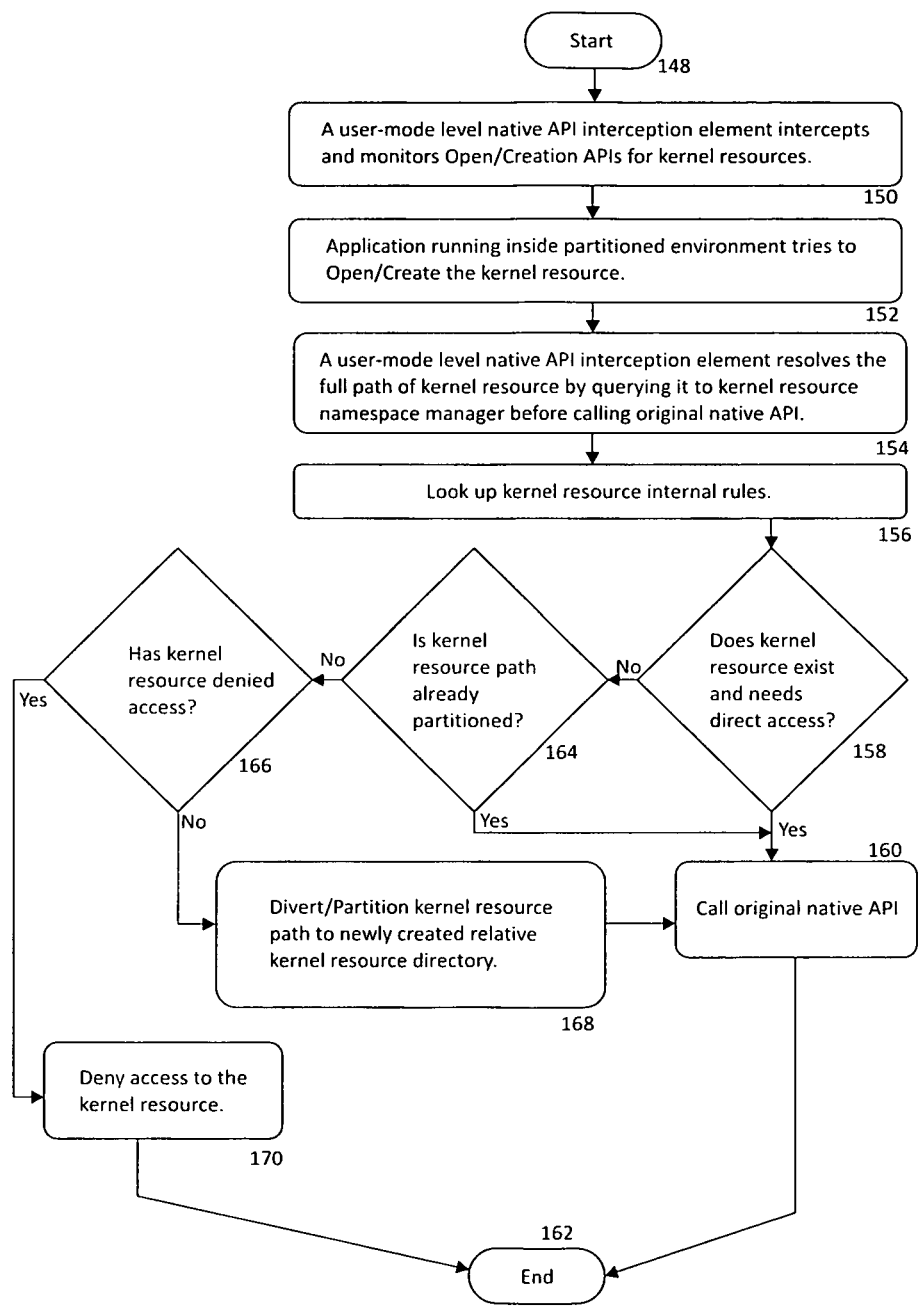
FIG. 4 shows a flowchart for partitioning of the kernel resource namespace for applications running inside partitioned environment in accordance with the present invention.

Referring to FIG. 4, a flowchart for partitioning of the kernel resource namespace for applications running inside partitioned environment in accordance with the present invention is shown. The process starts at 148 and at step 150 a user-mode level native API interception element intercepts and monitors Open/Creation APIs for kernel resources. The process moves to 152 where an application running inside partitioned environment tries to Open/Create the kernel resource and the process moves to 154. At 154, a user-mode level native API interception element resolves the full path of kernel resource by querying it to kernel resource namespace manager before calling original native API and the process moves to step 156 where kernel resource internal rules are looked up.

At step 158, whether kernel resource exists and needs direct access is determined. If the answer is "Yes", a call to original native APIs is made at step 160 and the process terminates at step 162. At step 164 it is determined whether kernel resource exists and needs direct access. If the answer is "No" then whether kernel resource path already partitioned is determined at 164. If the answer is "Yes", then again a call to original native APIs is made at step 160 and the process terminates at step 162. If the answer is "No", then whether kernel resource has been denied access is determined at 166. If the answer is again in the negative, then at step 168, kernel resource path is diverted/partitioned to newly created relative kernel resource directory. The process then moves to step 160 where a call to original native APIs is made at step 160 and the process terminates at step 162.

If the answer is "Yes" to question whether kernel resource has been denied access at step 166, then the process moves to 170 where access is denied to the kernel resource and the process terminates at step 162.

Figure 5:
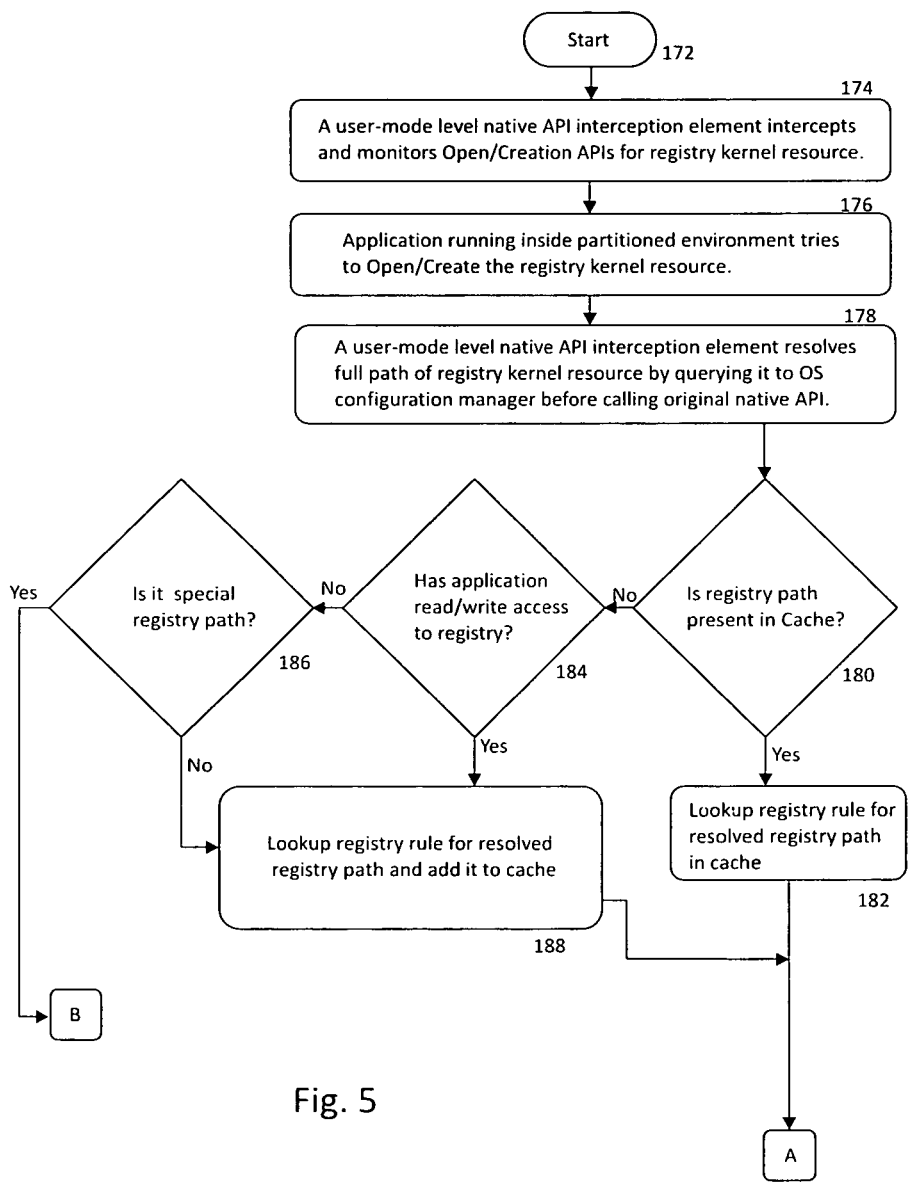
FIGS. 5-7 show flowcharts for partitioning of the registry kernel resource for applications running inside partitioned environment element which facilitates the user to launch a plurality of applications inside partitioned environment in accordance with the present invention.
Figure 6:
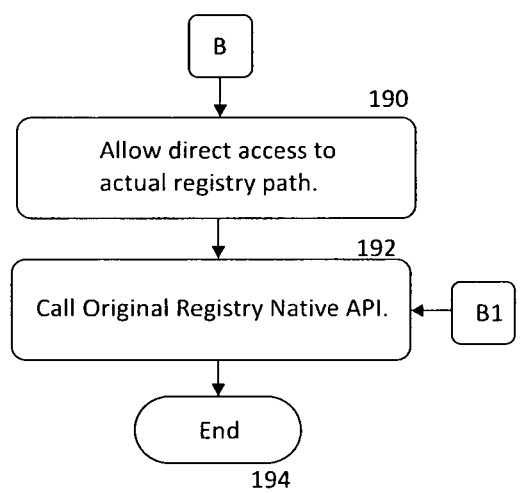
Figure 7:
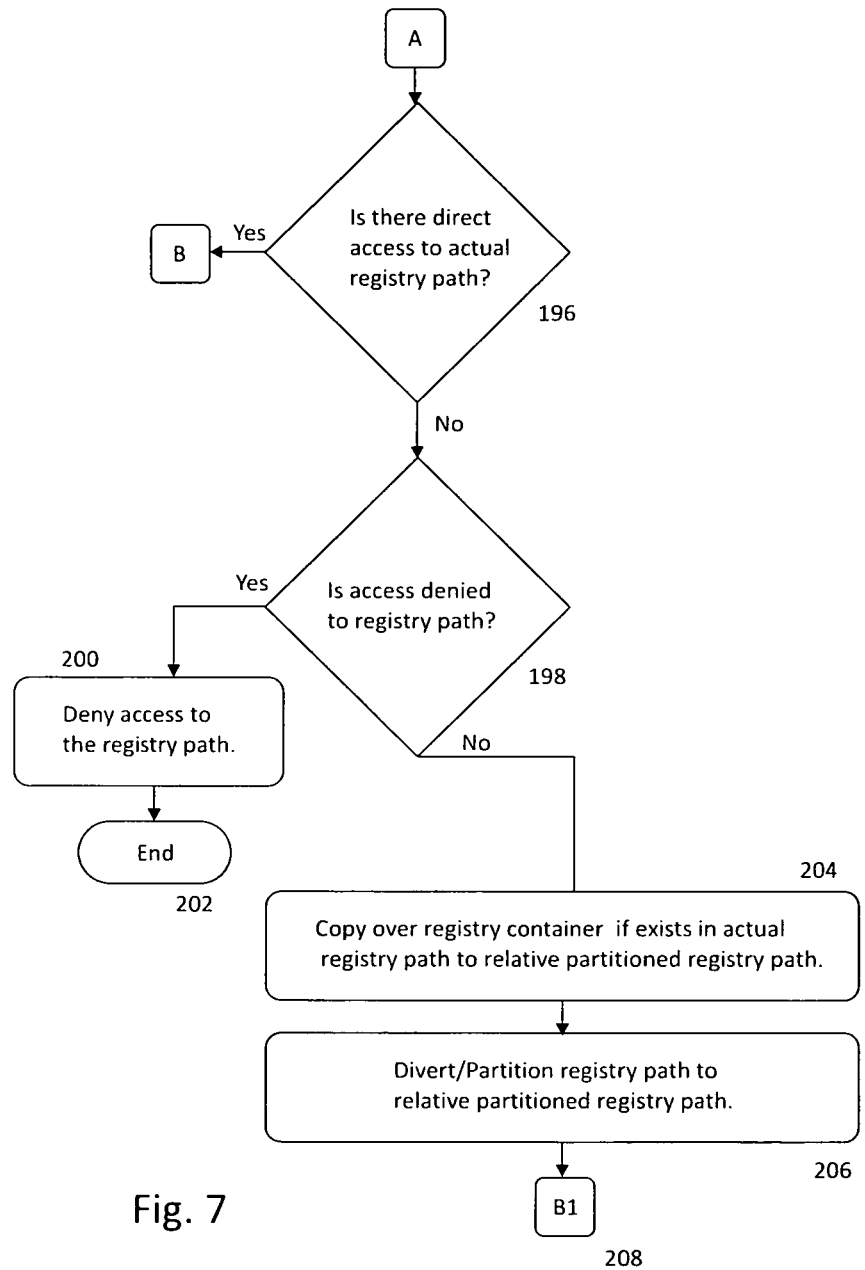

Referring to FIG. 5-7, flowcharts for partitioning of the registry kernel resource for applications running inside partitioned environment element which facilitates the user to launch a plurality of applications inside partitioned environment are shown. The process starts at 172 and at step 174 a user-mode level native API interception element intercepts and monitors Open/Creation APIs for registry kernel resource. The process moves to 176 where application running inside partitioned environment tries to Open/Create the registry kernel resource and the process moves to 178. At 178, a user-mode level native API interception element resolves full path of registry kernel resource by querying it to OS configuration manager before calling original native API and the process moves to step 180.

At step 180 it is determined whether registry path is present in Cache. If the answer is "Yes", registry rules are looked up at step 182 for resolved registry path in Cache and the process moves to point A. If the answer is "No", then at step 184 it is determined whether application has read/write access to registry. If the answer is "Yes", registry rules are looked up for resolved registry path and added to the Cache and then the process moves to point A. If the answer is "No", at step 18 it is determined whether the registry path is a special registry path. If the answer is again in the negative, registry rules are looked up for resolved registry path and added the Cache and then the process moves to point A. If the answer is "Yes", the process moves to point B.

Referring to FIG. 6, the process continues from point B and moves to step 190 where a direct access to actual registry path is allowed and at step 192 a call to original registry native API is made and the process is terminated at step 194. As described in the ensuing description of FIG. 7, the call to original registry native API is also made from point B1 and the process is terminated at step 194.

Referring to FIG. 7, the process continues from point A and moves to step 196. At 196, whether there is available a direct access to actual registry path is determined. If the answer is "Yes" the process moves to point B. If the answer is "No", at step 198 whether access is denied to registry path is determined. If the answer is "Yes", then at step 200 access is denied to the registry path and the process is terminated at step 202. If the answer is "No", then at step 204 registry container is copied that exists in actual registry path is copied to relative partitioned registry path and the process moves to step 206. At step 206, registry path is diverted/partitioned to relative partitioned registry path. The process continues to point B1.

Figure 8:
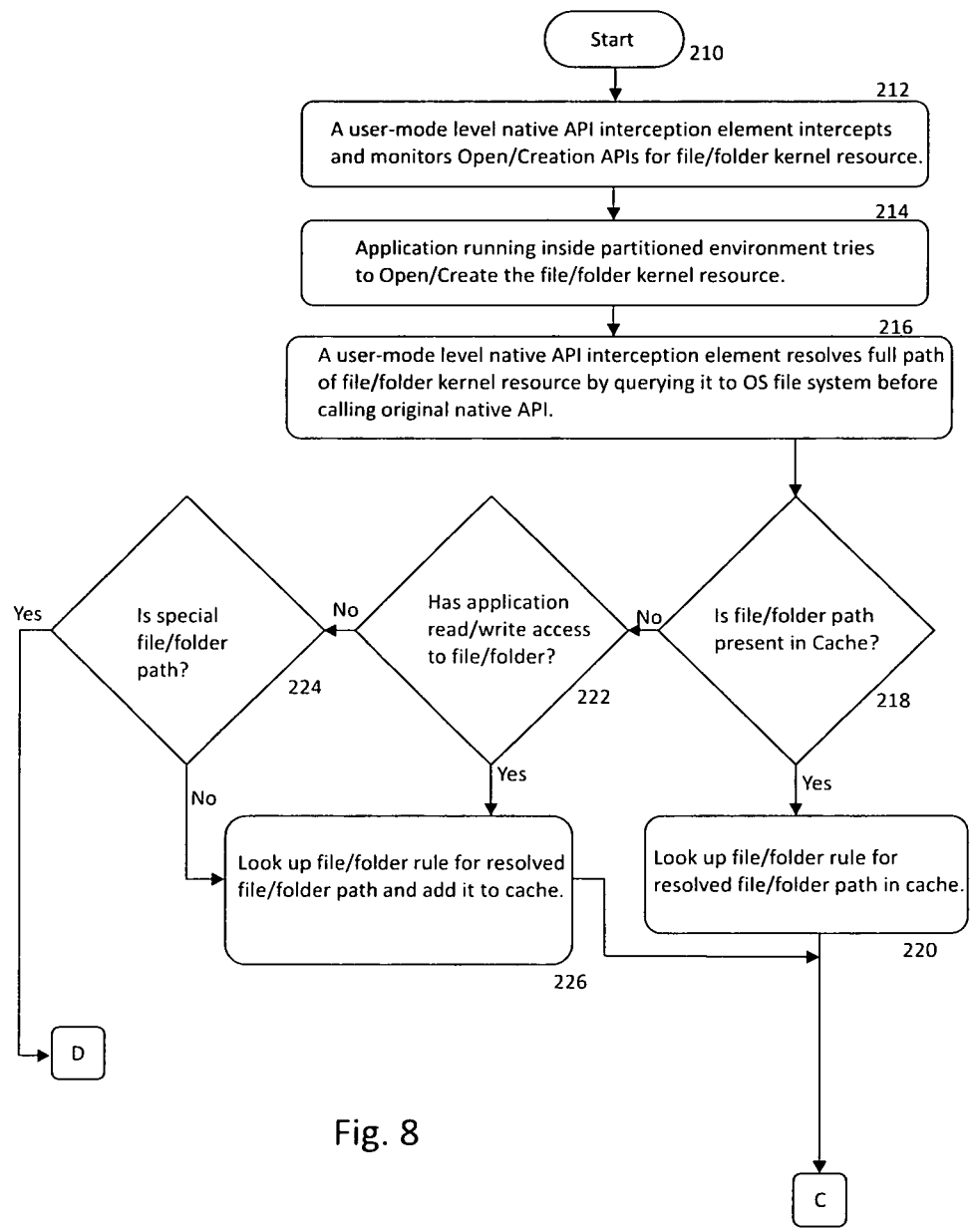
FIGS. 8-10 show flowcharts for partitioning of the file system kernel resource for applications running inside partitioned environment in accordance with the present invention.
Figure 9:
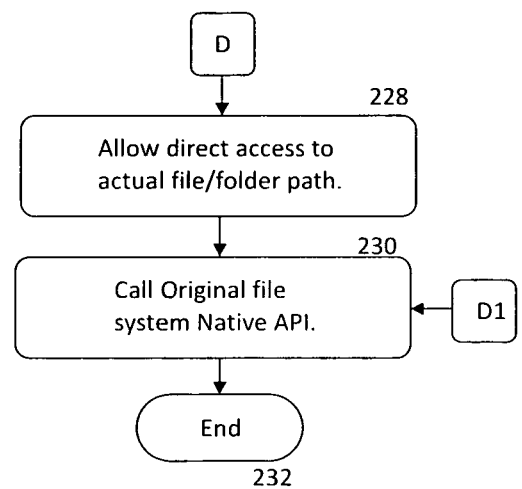
Figure 10:
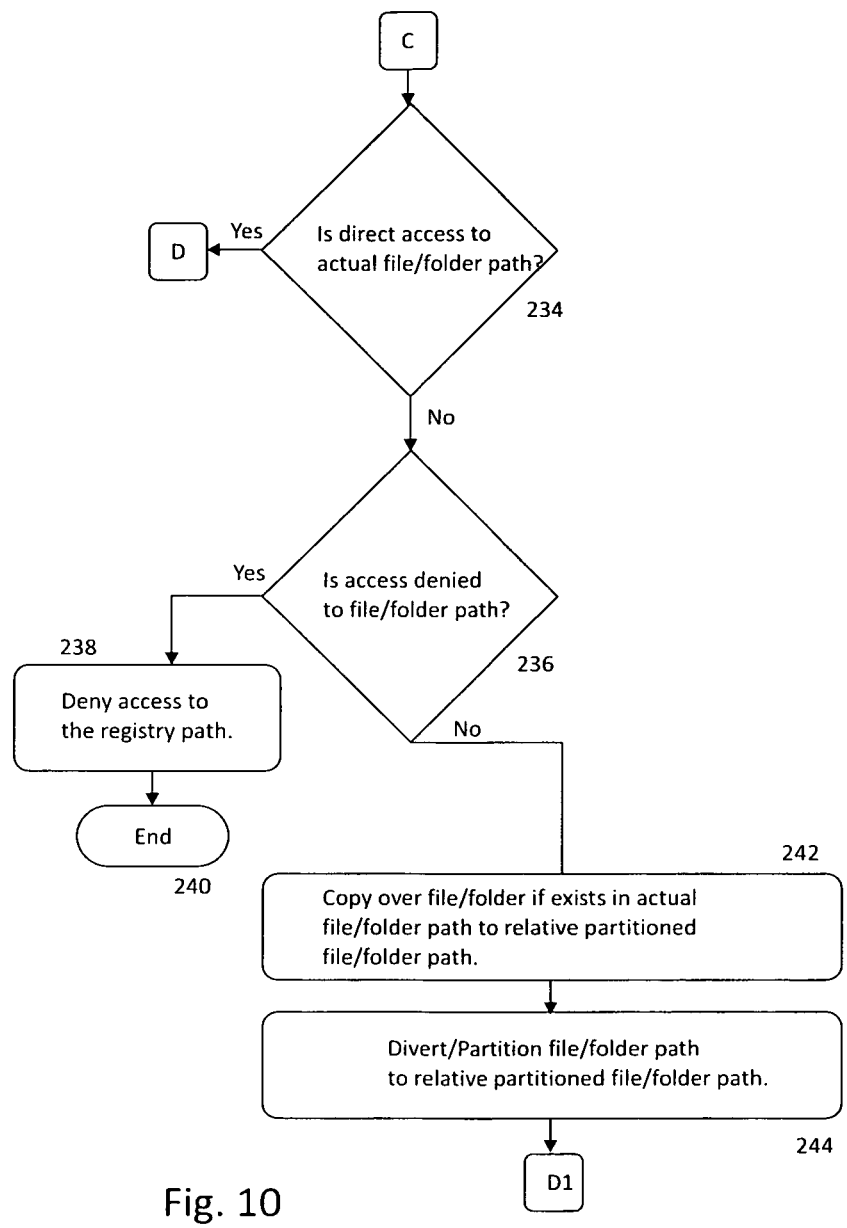

Referring to FIGS. 8-10, flowcharts for partitioning of the file system kernel resource for applications running inside partitioned environment, which is generally used for storing system and application programs, application data as well as user's data, are shown. The process starts at 210 and at step 212 a user-mode level native API interception element intercepts and monitors Open/Creation APIs for file/folder kernel resource. The process moves to 214 where application running inside partitioned environment tries to Open/Create the file/folder kernel resource and the process moves to 216. At 216, a user-mode level native API interception element resolves full path of file/folder kernel resource by querying it to OS file system before calling original native API and the process moves to step 218.

At step 218 whether file/folder path is present in Cache is determined. If the answer is "Yes", at step 220 file/folder rule for resolved file/folder path is looked up in cache and the process continues to point C. If the answer is "No", then at step 222 whether application has read/write access to file/folder is determined. If the answer is "Yes", at step 226 file/folder rule for resolved file/folder path is looked up and added to the cache and the process moves to point C. If the answer is "No", then at step 224 whether the file/folder path is special is determined. If the answer is again in the negative, then at step 226, file/folder rule for resolved file/folder path is looked up and added to the cache and the process moves to point C. If the answer is "Yes", then the process moves to point D.

Referring to FIG. 9, the process continues from point D and moves to step 228 where a direct access to actual file/folder path is allowed and at step 230 a call to original system native API is made and the process is terminated at step 232. As described in the ensuing description of FIG. 9, the call to original system native API is also made from point D1 and the process is terminated at step 232.

Referring to FIG. 10, the process continues from point C and moves to step 234. At 234, whether there is available a direct access to actual file/folder path is determined. If the answer is "Yes" the process moves to point D. If the answer is "No", at step 236 whether access is denied to file/folder path is determined. If the answer is "Yes" at step 236, access is denied to the registry path at step 238 and the process is terminated at step 240. If the answer is "No", then at step 242 a file/folder that exists in actual file/folder path is copied to relative partitioned file/folder path and the process moves to step 244 At step 244, file/folder path is diverted/partitioned to relative partitioned file/folder path. The process then continues to point D1.

Figure 11:
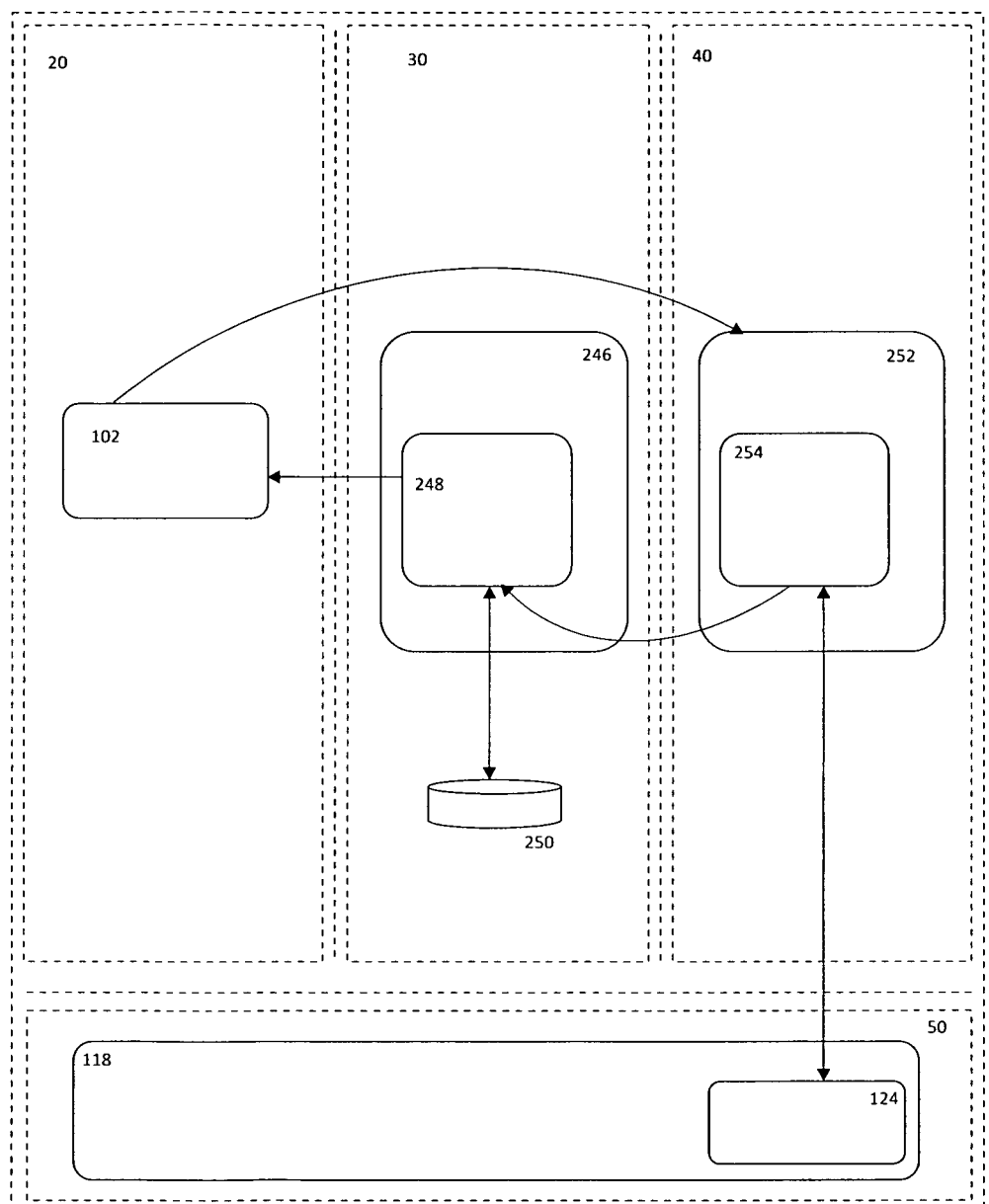
FIG. 11 shows a block diagram for another embodiment of a system in accordance with the present invention.

Referring to FIG. 11, a block diagram that represents another embodiment of the system in accordance with the present invention is shown. Operating system's Privileged Space 20 and System Components space of this embodiment essentially includes User Virtual Logon Session Manager (UVSLM) 102. The system also includes Logged-on User's Regular/Original Desktop space 30 that is visible to the user includes a Web Browser or Web Application 246. The Web Browser or Web application further includes a Browser Plugin Module 248 that intercepts Primary Web URL. Browser Plug-in Module 248 requests UVLSM 102 rendering of the primary web URL using another instance of the web browser or web application and monitors suspicious and malicious activities such as launching of executables, modification of startup locations, and notifies Browser Plugin Module 248 which writes malicious or suspicious URLs to a Database 250.

The Logged-on User's Separate/Partitioned Desktop space 40 also includes a Web Browser or Web Application 252 which is launched by UVLSM 102, and further includes a Process Creation and Load Monitoring Interception Module 254 that communicates with OS Kernel (Driver) space. The Process Creation and Load Interception Module 254 interacts with Process Filter Module (PFM) 124 that resides within Kernel Filter Device Driver (KFDD) 118 and takes care of process creation and module load notification. The Process Creation and Load Interception Module 254 also reports malicious or suspicious websites to Browser Plug-in Module 248.

The system according to this particular embodiment also includes the Kernel Filter Device Driver (KFDD) Component 118 which is a device driver that resides inside the OS kernel space and monitors the various operations of the applications running inside partitioned environment, such as, file system, registry and process operations, for example. The system also further includes the (PFM) 124 which is a part of KFDD 118 that resides inside the OS kernel space. PFM 124 filters the various process operations of the applications running inside partitioned environment. UVLSM 102 component specifies process rules which includes process paths and action needs to be taken. PFM 124 follows the process rules to deny/allow/notify for process kernel resource in the context of partitioned applications. The Kernel Filter Device Driver (KFDD) Component 118 forms the OS Kernel (Driver) space.

The present embodiment is particularly aimed at tackling malware, especially on malicious websites. Generally web malware exploits vulnerabilities, such as, bugs in the binary code, for example, in the web browser or web application or its plug-in to run its machine code, which a Central Processing Unit (CPU) understands, inside user computer when a user browses or visits the malicious web site. Malware writers try to also infect or exploit legitimate web sites by using methods or attacks, such as, Structured Query Language (SQL) injection attacks, for example. Once the legitimate web site is compromised malware writer is free to introduce malicious content on the web site. Apart from exploiting legitimate web sites, malware writer also uses spam emails as one of the method to send the malicious web site links to the interne users all over the world to divert the users to this malicious web site.

Once the user visits malicious web site, a malicious web based script, such as, Java Script, Visual Basic Script, for example, runs inside user's web browser or web application. The malicious scripts check version of web browser or web application or plug-in or vulnerability signature (unique identification for vulnerability code for web browser or web application or its plug-in) inside the web browser or web application process. The detected vulnerabilities or bugs are exploited and a binary code, which is machine code understood by CPU, is run inside web browser or web application. The web browser or web application downloads and run the actual malware content which may reside on same or different web site.

The system according to the present embodiment is used to prevent such attacks that happen when a hapless user browses the web using web browser or web application by clicking on any web URL (Universal Resource Locator) link or by typing the web URL in the web browser or web application. According to the present embodiment, user uses the web browser or web application to browse the web on regular desktop. User Virtual Logon Session (UVLS) or Partitioned Environment (PE) is created in the background which is transparent to the user. One of the module of the system runs as a plug-in inside web browser or web application which runs on regular desktop. The plug-in module intercepts each and every primary web URL passing through the web browser or web application. The plug-in module then launches another instance of the web browser or web application inside UVLS with the help of User Virtual Logon Session Manager (UVLSM) 102 using primary web URL. The plug-in module then waits to see if primary web URL is infected by drive by download malware.

Figure 12:
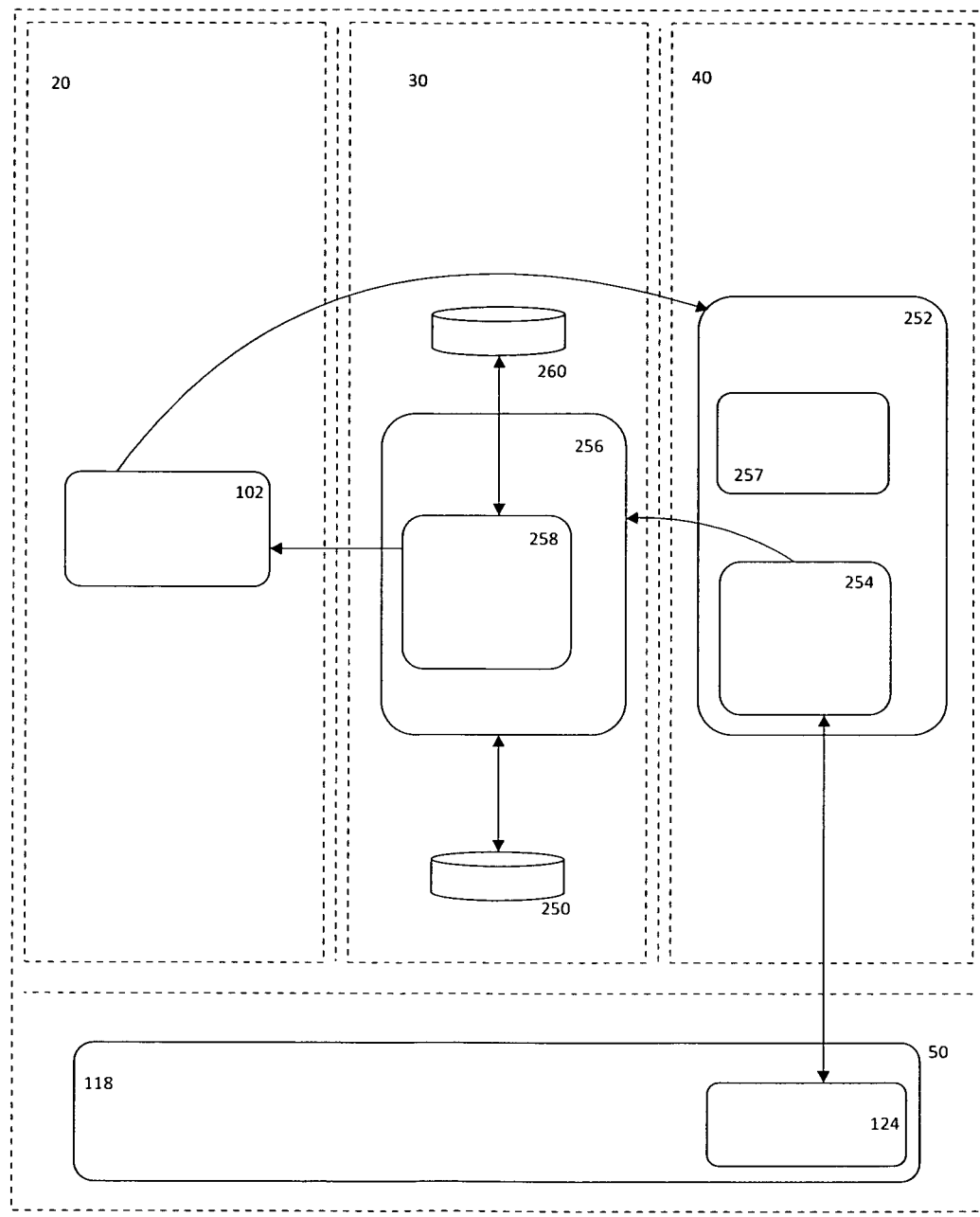
FIG. 12 shows a block diagram for yet another embodiment of a system in accordance with the present invention.

Referring to FIG. 12, a block diagram that represents yet another embodiment of the system in accordance with the present invention is shown. Operating system's Privileged Space and System Components space 20 of this embodiment essentially includes User Virtual Logon Session Manager (UVSLM) 102. The system also includes Logged-on User's Regular/Original Desktop space 30 that is visible to the user includes a Web Crawler 256. The Web Crawler 246 further includes an HTML Parser module 258 that parses HTML pages to find embedded URLs and writes and updates a Seed URL database 258. The HTML Parser Module 258 requests UVLSM 102 rendering of the primary web URL using another instance of the web browser or web application. The Web Crawler reports each every URL in the webpage to a Seed URL Database 260. Seed URL Database 260 is a grand repository of all the links contained in every page crawled by the Web Crawler 256. Process Filter Module (PFM) 124 monitors suspicious activities such as launching of executables, modification of startup locations of resources, such as, registry and folders, for example and notifies URLs to the Malicious URL Database 250.

The system according to this particular embodiment also includes the Kernel Filter Device Driver (KFDD) Component 118 which is a device driver that resides inside the OS kernel space and monitors the various operations of the applications running inside partitioned environment, such as, file system, registry and process operations, for example. The system also further includes the Process Filter Module (PFM) 124 which is a part of KFDD 118 that resides inside the OS kernel space. PFM 124 filters the various process operations of the applications running inside partitioned environment. UVLSM 102 component specifies process rules which includes process paths and action needs to be taken. PFM 124 follows the process rules to deny/allow/notify for process kernel resource in the context of partitioned applications. The Kernel Filter Device Driver (KFDD) Component 118 forms the OS Kernel (Driver) space.

The Logged-on User's Separate/Partitioned Desktop space 40 also includes a Web Browser or Web Application 252 which is launched by UVLSM 102, and further includes a Process Creation and Load Monitoring Interception Module 254 that communicates with OS Kernel (Driver) space and notifies Web Crawler 256. The Web Browser or Web Application is un-patched in this particular embodiment and also includes browser plug-in modules that are un-patched 257. The Process Creation and Load Interception Module 254 interacts with Process Filter Module (PFM) 124 that resides within Kernel Filter Device Driver (KFDD) and takes care of process creation and module load notification. The Process Creation and Load Interception Module 254 also reports malicious or suspicious websites to Browser Plug-in Module 248.

The Process Creation and Load Interception Module 254 runs inside web browser or web application which runs inside UVLS 102 and in the background (not visible to the user) to monitor process creation or dynamic module loading into the web browser or web application process. UVLS Web browser or web application then renders the primary web URL given by plug-in module to see the repercussions. After rendering the primary web URL, Process Creation and Load Interception Module 254 tries to see if any process is getting created or dynamic module is getting loaded inside UVLS web browser or web application process. This Process Creation and Load Interception Module 254 then checks the file system path of this process (application) or module. If the file system path belongs to partitioned file system store of UVLS 102, is newly created and the binary file does not exist in real/actual (non-partitioned) file system and an alarm triggered about drive by download exploit attack that was caused by visiting the given primary web site URL. Process Creation and Load Interception Module 254 reports the malicious or suspicious primary web URL.

I claim:

1. A segregation method for a computer operating system installed on a computer comprising the steps of:
   providing a virtual and protected environment partitioned from the computer operating system;
   running user-selected applications within the virtual and protected environment;
   intercepting kernel resources related to the user-selected applications running within the virtual and protected environment;
   permitting certain kernel resources based on user credentials and malware attack prevention;
   blocking other kernel resources based on user credentials and malware attack prevention;
   applying file system rules to deny, allow, read-only, read-write access to file system kernel resources in a context of the user-selected applications;
   applying registry rules to deny, allow, read-only, read-write access to registry kernel resources in a context of the user-selected applications; and
   applying process rules to deny, allow or notify for process kernel resource in a context of the user-selected applications.

2. The method of claim 1, further comprising the step of:
   identifying and matching the user selected applications with a name and a path of a list of applications provided by a user.

3. The method of claim 1, further comprising the step of:
   performing an OS specific interception.

4. The method of claim 1, further comprising the steps of:
   reporting malicious or suspicious content, application or websites and
   storing related data in a database.

5. A segregation system for a computer operating system installed on a computer comprising:
   one or more processors;
   one or more non-transitory computer-readable storage mediums containing instructions configured to cause the one or more processors to perform operations including:
   providing a virtual and protected environment partitioned from the computer operating system;
   running user-selected applications within the virtual and protected environment;
   intercepting kernel resources related to the user-selected applications running within the virtual and protected environment;
   permitting certain kernel resources based on user credentials and malware attack prevention;
   blocking other kernel resources based on user credentials and malware attack prevention;
   applying file system rules to deny, allow, read-only, read-write access to file system kernel resources in a context of the user-selected applications;
   applying registry rules to deny, allow, read-only, read-write access to registry kernel resources in a context of the user-selected applications; and
   applying process rules to deny, allow or notify for process kernel resource in a context of the user-selected applications.

6. The segregation system of claim 5 further containing instructions configured to cause the one or more processors to perform an operation including:
   identifying and matching the user selected applications with a name and a path of a list of applications provided by a user.

7. The segregation system of claim 5 further containing instructions configured to cause the one or more processors to perform an operation including:
   performing an OS specific interception.

8. The segregation system of claim 5 further containing instructions configured to cause the one or more processors to perform operations including:
   reporting malicious or suspicious content, application or websites; and
   storing related data in a database.

9. A computer-program product, the product tangibly embodied in a non-transitory, machine-readable storage medium, including instructions configured to cause a data processing apparatus to:
   provide a virtual and protected environment partitioned from the computer operating system;

run user-selected applications within the virtual and protected environment;
intercept kernel resources related to the user-selected applications running within the virtual and protected environment;
permit the kernel resources based on user credentials and malware attack prevention;
block other kernel resources based on user credentials and malware attack prevention;
apply file system rules to deny, allow, read-only, read-write access to file system kernel resources in a context of the user-selected applications;
apply registry rules to deny, allow, read-only, read-write access to registry kernel resources in a context of the user-selected applications; and
apply process rules to deny, allow or notify for process kernel resource in a context of the user-selected applications.

10. The computer-program product of claim 9, further including an instruction configured to cause a data processing apparatus to:
identify and match the user selected applications with a name and a path of a list of applications provided by a user.

11. The computer-program product of claim 9, further including an instruction configured to cause a data processing apparatus to:
perform an OS specific interception.

12. The computer-program product of claim 9, further including instructions configured to cause a data processing apparatus to:
report malicious or suspicious content, application or websites; and
store related data in a database.

* * * * *